United States Patent
Nakashima et al.

(10) Patent No.: US 8,178,613 B2
(45) Date of Patent: May 15, 2012

(54) ACRYLOXY-FUNCTIONAL SILICONE COMPOSITION CURABLE BY HIGH-ENERGY RADIATION

(75) Inventors: Hisataka Nakashima, Shizuoka Prefecture (JP); Mari Wakita, Midland, MI (US); Hideki Kobayashi, Chiba Prefecture (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 1365 days.

(21) Appl. No.: 10/547,837

(22) PCT Filed: Mar. 5, 2004

(86) PCT No.: PCT/JP2004/002927
§ 371 (c)(1),
(2), (4) Date: Jun. 26, 2006

(87) PCT Pub. No.: WO2004/078863
PCT Pub. Date: Sep. 16, 2004

(65) Prior Publication Data
US 2007/0032587 A1 Feb. 8, 2007

(30) Foreign Application Priority Data
Mar. 6, 2003 (JP) ................................. 2003-059264

(51) Int. Cl.
*C08G 77/28* (2006.01)
(52) U.S. Cl. ............. 524/588; 522/148; 528/26; 528/38
(58) Field of Classification Search .................... 528/20, 528/26, 38; 522/33, 40; 524/588; 526/148
See application file for complete search history.

(56) References Cited

U.S. PATENT DOCUMENTS

| 4,603,086 A | | 7/1986 | Fujii et al. | |
| 5,260,350 A | * | 11/1993 | Wright | 522/42 |
| 5,840,428 A | * | 11/1998 | Blizzard et al. | 428/412 |

FOREIGN PATENT DOCUMENTS

| EP | 0 437 327 A3 | 7/1991 |
| EP | 0 666 290 A1 | 8/1995 |
| EP | 0 735 066 A3 | 8/1997 |
| EP | 0 687 713 B1 | 10/1997 |
| EP | 1 167 406 B1 | 1/2005 |
| JP | 11-011361 | 1/1999 |

OTHER PUBLICATIONS

English language Abstract for JP 11-012361 extracted from espacenet.com database dated Sep. 1, 2005.

* cited by examiner

*Primary Examiner* — Margaret Moore
(74) *Attorney, Agent, or Firm* — Howard & Howard Attorneys PLLC

(57) ABSTRACT

An acryloxy-functional silicone composition curable by high-energy radiation, which is characterized by excellent storage stability of the composition and by improved resistance to scratching, transparency, water repellency, and adhesiveness in a hard cured coating film produced from the aforementioned composition. This composition comprises (A) a polyfunctional acrylate of at least one type; an amino-modified organopolysiloxane (B) or a product (F) of a Michael addition reaction between at least one type of a polyfunctional acrylate and amino-modified organopolysiloxane; (C) an organoalkoxysilane having an aliphatic unsaturated bond, (D) a colloidal silica; and (E) an alcohol-containing organic solvent.

18 Claims, No Drawings

ACRYLOXY-FUNCTIONAL SILICONE COMPOSITION CURABLE BY HIGH-ENERGY RADIATION

The present invention relates to an acryloxy-functional silicone composition curable by high-energy radiation, which is characterized by excellent storage stability and is suitable for forming cured coating films that demonstrate improved resistance to scratching, transparency, water repellency, and adhesiveness.

Known radiation-curable coating agents that are cured when exposed to ultraviolet rays, electron beams, gamma rays, or similar beams of high-energy radiation may comprise a composition that consists of a polyfunctional acrylate monomer, amino-functional alkoxysilane, and colloidal silica (see EP687713, EP666290, EP437327), or products of a Michael addition reaction between a diacrylate and amino-modified polysiloxane (see U.S. Pat. No. 4,603,086 and Japanese Patent Application Publication No. Hei 11-12361).

However, the first-mentioned coating agents that contain an amino-functional alkoxysilane and colloidal silica are subject to gelling and have low stability in storage, while the second-mentioned products of the addition reaction between a diacrylate and amino-modified polysiloxane have low resistance to scratching when formed into a cured film.

It is an object of the present invention to provide an acryloxy-functional silicone composition curable by high-energy radiation, which is characterized by excellent storage stability, improved resistance to scratching, transparency, water repellency, and improved adhesiveness when cured into a coating film.

The present invention relates to an acryloxy-functional silicone composition curable by high-energy radiation, comprising:
(A) a polyfunctional acrylate of at least one type;
(B) an amino-modified organopolysiloxane, wherein the mole quantity of amino groups in component (B) is smaller than the mole quantity of acrylate-functional groups in component (A);
(C) an organoalkoxysilane having an aliphatic unsaturated bond;
(D) a colloidal silica; and
(E) an alcohol-containing organic solvent.

Furthermore, the invention relates to an acryloxy-functional silicone composition curable by high-energy radiation, comprising:
(A) a polyfunctional acrylate of at least one type;
(F) a product of a Michael addition reaction between (A) at least one type of a polyfunctional acrylate and (B) an amino-modified organopolysiloxane;
(C) an organoalkoxysilane having an aliphatic unsaturated bond,
(D) a colloidal silica; and
(E) an alcohol-containing organic solvent.

Component (A) is the one that imparts to the composition of the present invention the property of curability under the effect of radiation. This component comprises an acrylate of bi- or higher functionality. The following are specific examples of compounds suitable for use as component (A): 1,6-hexanediol diacrylate, 1,4-butanediol diacrylate, ethyleneglycol diacrylate, diethyleneglycol diacrylate, tetraethyleneglycol diacrylate, tripropyleneglycol diacrylate, neopentylglycol diacrylate, 1,4-butanediol dimethacrylate, poly(butanediol) diacrylate, tetraethyleneglycol dimethacrylate, 1,3-butyleneglycol diacrylate, triethyleneglycol diacrylate, triisopropyleneglycol diacrylate, polyethyleneglycol diacrylate, bisphenol A dimethacrylate, or a similar bifunctional acrylate monomer; trimethylolpropane triacrylate, trimethylolpropane trimethacrylate, pentaerythritolmonohydroxy triacrylate, trimethylolpropane triethoxytriacrylate, or a similar trifunctional acrylate monomer; pentaerythritol tetraacrylate, ditrimethylolpropane tetraacrylate, or a similar tetrafunctional acrylate monomer; dipentaerythritol hexaacrylate, dipentaerythritol (monohydroxy) pentaacrylate, or similar acrylate monomer of a penta- or higher functionality. Oligomers of polyfunctional acrylates also can be used and may be represented by the following specific examples: bisphenol A epoxydiacrylate, hexafunctional aromatic urethaneacrylate [trademark: Ebecryl 220/UCB Chemicals Corp.], aliphatic urethanediacrylate [trademark: Ebecryl 230/UCB Chemicals Corp.], and tetrafunctional polyesteracrylate [trademark: Ebecryl 80/UCB Chemicals Corp.]. The aforementioned polyfunctional acrylates can be used individually or in combination of two or more. Most preferable of the above are acrylates of penta- or higher functionality. These should be used in an amount of greater than 30 wt. %, preferably greater than 50 wt. %, and even more preferably, greater than 80 wt. % of component (A).

Component (B) is the one that imparts to a cured coating film obtained from the composition of the present invention such properties as water-repellency and lubricity. This component is an organopolysiloxane fluid that contains amino-functional organic groups on its molecular terminals and partially in the side molecular chains. The aforementioned amino-functional organic groups can be represented by 2-aminoethyl group, 3-aminopropyl group, 3-(2-aminoethyl) aminopropyl group, and 6-aminohexyl group. Silicon-bonded groups other than amino-functional organic groups may also be used and can be represented by methyl group, ethyl group, propyl group, or similar alkyl groups; phenyl group, or similar aryl groups; methoxy group, ethoxy group, propoxy group, or similar alkoxy groups; and hydroxyl group. Most preferable of the above are methyl group. The organopolysiloxane of component (B) may have a linear, or a partially-branched linear structure. This organopolysiloxane should have a degree of polymerization within the range of 2 to 1000, preferably within the range of 2 to 500, and even more preferably, within the range of 2 to 300. Examples of component (B) may comprise organopolysiloxanes that contain primary amine groups and are represented by the formulae given below. In these formulae, Me designates methyl groups.

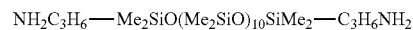

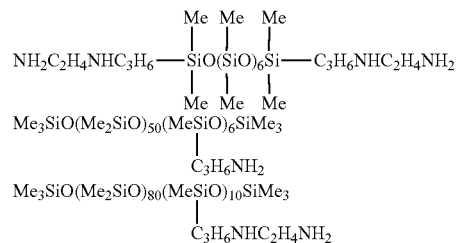

It is recommended to use component (B) in such an amount that provides a smaller mole quantity of total amine groups of component (B) than the mole quantity of acrylate-functional groups of component (A). It is preferable that the weight of component (B) be less than ⅕th of the weight of component (A).

Component (F) is a product of a reaction between the acrylate-functional groups of component (A) as described above and amino groups of component (B) which were also described above.

Component (C) is an organoalkoxysilane having an aliphatic unsaturated bond. It improves affinity between the colloidal silica of component (D) and component (A) or component (B) and imparts to the composition an improved storage stability when the surface of component (D) is treated with component (C). In the course of curing, it reacts with component (A), and thus increases the degree of cross-linking in a cured product. The groups with an aliphatic unsaturated bond used in this component may be exemplified by 3-(methacryloxy) propyl group, 3-(acryloxy) propyl group, or similar acryl-containing organic groups; vinyl group, allyl group, or similar alkenyl groups. Alkoxy groups can be represented by methoxy group, ethoxy group, propoxy group, and butoxy group. The aforementioned component (C) can be exemplified by the following compounds: 3-(methacryloxy) propyl trimethoxysilane, 3-(methacryloxy) propyltriethoxysilane, 3-(methacryloxy) propylmethyldimethoxysilane, 3-(acryloxy) propyltrimethoxysilane, vinyltrimethoxysilane, vinyltriethoxysilane, methylvinyldimethoxysilane, and allyltriethoxysilane.

Component (D) is a colloidal silica. Component (D) is used for increasing hardness and resistance to scratching of a coating film cured from the composition of the present invention. Component (D) may comprise a colloidal silica dispersible in water, alcohol, or an organic solvent. It is recommended to have an average particle size of the colloidal silica within the range from several to several tens of nanometers.

Component (E) is an alcohol-containing organic solvent. The following are examples of the alcohol of component (E): methanol, ethanol, isopropyl alcohol, butanol, isobutyl alcohol, ethyleneglycol, diethyleneglycol, triethyleneglycol, ethyleneglycol monomethyl ether, diethyleneglycol monomethyl ether, and triethyleneglycol monomethyl ether. The following are organic solvents that can be used besides the alcohol: acetone, methylethylketone, methylisobutylketone, or similar ketones; toluene, xylene, or similar aromatic hydrocarbons; hexane, octane, heptane, or similar aliphatic hydrocarbons; chloroform, methylene chloride, trichloroethylene, carbon tetrachloride, or similar organic chlorine-containing solvents; ethyl acetate, butyl acetate, isobutyl acetate, or a similar fatty acid ester. Component (E) may contain alcohol alone or alcohol in a mixture with a solvent of another type. The mixture may contain alcohols and solvents of two or more different types. The alcohol may be used in an amount of 10 to 90 wt. %, preferably, 30 to 70 wt. %, of the total weight of the solvent.

There are no special restrictions with regard to the content of each components except for component (B), but it is recommended that component (B) and component (C) be used in an each amount of 1 to 30 parts, preferably 1 to 20 parts by weight, for each 100 parts by weight of component (A). Component (D) should be used in an amount of 1 to 100 parts by weight, preferably 1 to 80 parts by weight, for each 100 parts by weight of component (A). Component (E) should be used in an amount of 10 to 1000 parts by weight, preferably, 10 to 500 parts by weight for each 100 parts by weight of component (A). Component (F) should be used in an amount of 1 to 100 parts by weight, preferably 1 to 50 parts by weight, for each 100 parts by weight of component (A).

Optionally, the compositions may also include water (Component (G)) for hydrolysis of component (C). It can be added in an amount of 1 to 50 parts by weight, preferably 5 to 30 parts by weight, for each 100 parts by weight of component (C). Normally, component (C) interacts with silanol groups on the surface of colloidal silica of component (D) and is hydrolyzed by component (G). Therefore, component (G) could be used in an amount less than required for the hydrolysis of the entire component (C).

In the case of curing by ultraviolet radiation, the acryloxy-functional silicone composition of the present invention may contain a photopolymerization initiator (H) of at least one type.

It may comprise, e.g., a 2-methyl-{4-(methylthio) phenyl}-2-morpholino-1-propane (the product of Chiba-Geigy Japan, registered trademark: IRGACURE 907®) and 1-hydroxycyclohexylphenyl ketone (the product of Chiba-Geigy Japan, trademark: IRGACURE 184®). Benzophenone, acetophenone, benzoin, or various benzoin derivatives and other suitable known photopolymerization initiators can be used for the same purpose. The photopolymerization initiator can be used individually or in a mixture of two or more. There is no special restriction with regard to the amount of component (H) in the composition of the invention, but in general it should be added within the range of 1 to 30 parts by weight, preferably 1 to 20 parts by weight for each 100 parts by weight of component (A).

Within the limits not contradictory to the purposes of the present invention, the composition of the present invention can contain various additives, such as tetramethoxysilane, tetraethoxysilane, tetra(isopropoxy)silane or a similar tetraalkoxysilane; methyltrimethoxysilane, methyltriethoxysilane, methyltri(isopropoxy)silane, ethyltrimethoxysilane, ethyltriethoxysilane, ethyltri(isopropoxy)silane, or a similar alkylalkoxysilane.

If necessary, the composition of the present invention can also contain thickeners; ultraviolet ray absorbers; various pigments, dyes, or similar coloring agents; aluminum paste, talc, glass frit, metal powder, etc.; butylated hydroxytoluene (BHT), phenothiazine (PTZ), or similar acrylate-type inhibitors of self-polymerization, or other additives.

There are no special restrictions with regard to a method suitable for the preparation of the composition of the present invention, and normally, the components are uniformly mixed merely by stirring. In this case, it is recommended first to cause a reaction between components (A) and (B) and then to add other components. Since the mole quantity of amino groups of component (B) is smaller than the mole quantity of acrylate-functional groups of component (A), following the completion of the reaction between component (A) and component (B), a mixture is then prepared from the unreacted portion of component (A) and Component (F) which is a product of the Michael addition reaction between components (A) and (B). For example, the composition of the invention can be prepared by causing a reaction between components (A) and (B) in component (E) by mixing the aforementioned components during a period of time from 1 min. to 20 hours at a temperature within the range from room temperature to the solvent reflux temperature, then adding components (C) and (D), if necessary, with component (G), and continuing mixing for another period from 1 min. to 20 hours at a temperature within the range from room temperature to solvent reflux temperature. Alternatively, the composition can be prepared by causing a reaction between components (A) and (B) in component (E) by mixing the aforementioned components during a period from 1 min. to 20 hours at a temperature within the range from room temperature to the solvent reflux temperature, combining the product with a mixture obtained by mixing component (G) with the mixture of components (C) and (D), or combining the product with a mixture of components (C), (D), and (G), and then mixing the resulting mixture during a period from 1 min. to 20 hours at a temperature within the range from room temperature to solvent reflux temperature. Component (H) can be added and admixed after cooling.

The composition of the present invention can be applied onto various substrates, dried, and then cured during a very short period by exposing it to a radiant energy. The radiation energy may comprise ultraviolet radiation, electron beams, gamma radiation, or the like. In the case of ultraviolet radiation, a cured thin coating film can be formed during an extremely short exposure time. It is recommended that the amount of radiation be no less than 2 mJ/cm$^2$, preferably within the range of 10 to 2000 mJ/cm$^2$. If curing is carried out with the use of electron beams or gamma rays, component (H) may not be needed. Although the composition of the present invention can be dried at room temperature, the drying process can be accelerated by heating.

There are no special restrictions with regard to substrates suitable for application of the composition of the present invention. For example, the substrate can be made from such materials as polyethylene, polypropylene, or similar polyolefin-type resins; polyethyleneterephthalate, polyethyleneisophthalate, polyethylene-2,6-napthalate, polybutyleneterephthalate, and copolymers thereof, or similar polyester-type resins; polyoxymethylene, or similar polyamide-type resins; polystyrene, poly(meta)acrylic acid ester, polyacrylonitrile, vinyl polyacetate, polycarbonate, cellophane, polyimide, polyetherimide, polyphenylenesulfone, polysulfone, polyetherketone, ionomeric resins, fluoro resin, or a similar thermoplastic resin; melamine resin, polyurethane resin, epoxy resin, phenol resin, unsaturated polyester resin, alkyd resin, urea resin, silicone resin, or a similar thermosetting resin. No special restrictions exist with regard to the form of the substrate, and the latter may comprise a film, sheet, bottle, solid body, or the like. Most preferable is a thermoplastic film. There are no special restrictions with regard to the thickness of the substrate, but in the case of a film or sheet, it is preferably within the range of 5 to 100 μm.

The composition of the present invention can be applied onto a substrate in the form of a thin layer by any suitable method, such flow coating, dip coating, spin coating, spray coating, curtain coating, gravure coating, and Meyer bar coating. Prior to application of the composition, the surface of the substrate can be subjected to a known activation treatment such as corona-discharge treatment, or anchor treatment with the use of an urethane resin. When it is required to provide resistance to scratching, the thickness of the layer is preferably within the range of 0.5 to 25 μm, more preferably, 1 to 20 μm. Following the coating, the thin layer is dried and cured.

When the composition of the acryloxy-functional silicone composition of the invention curable by high-energy radiation is prepared from aforementioned components (A) through (E), if necessary, with an addition of components (G) and (H), it becomes possible to provide excellent stability of the composition in storage and improved resistance to scratching, transparency, water repellency, and adhesiveness in a hard cured coating film produced from the aforementioned composition.

The present invention will now be described with reference to practical examples. In these examples, all parts are parts by weight, and Me designates a methyl group. Values of viscosity correspond to viscosity at 25° C. Contact angle of thin cured layers with water was measured with the use of an automatic contact angle meter of CA-Z model manufactured by Kyowa Kaimen Kagaku Co., Ltd.

PRACTICAL EXAMPLE 1

A flask was filled with 52.3 g of toluene, 21 g of isopropyl alcohol (hereinafter referred to as IPA), and 23.9 g of a mixture of dipentaerytliritol hexaacrylate (60 wt. %) and dipentaaerythritol (monohydroxy) pentaacrylate (40 wt. %) (content of acrylate-functional groups: 0.24 mole), and the components were stirred. Following this, 1.49 g of an amino-modified dimethylpolysiloxane fluid (content of amino groups: 0.001 mole) of the average molecular formula given below were added, and the mixture was heated and stirred for 1 hour at 50° C.

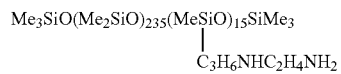

As a result, a reaction mixture was produced.

The product was combined sequentially with 3.74 g of 3-methacryloxypropyl trimethoxysilane, 44.9 g of an IPA dispersion of a colloidal silica (concentration: 30 wt. %; average size of a colloidal silica particle: 13 nm), 0.46 g of water, and the components were stirred for 1 hours. After the mixture was cooled, 2.25 g of a photopolymerization initiator (the product of Chiba-Geigy Japan, registered trademark: IRGACURE 184®), and 4.5 mg of phenothiazine were added. The resulting product comprised an acryloxy-functional silicone composition A. Melt viscosity of the composition was 3 mm$^2$/s and remained practically unchanged after 6 months of storage. Thus, it could be concluded that composition A had good storage stability.

With the use of a bar coater, the obtained composition A was applied onto a 188 μm-thick PET film, and the coating was dried for 2 minutes at 120° C. The coating was then cured by exposing to ultraviolet radiation having intensity of 350 mJ/cm$^2$. This produced a PET film coated with a 2 μm-thick coating layer of cured composition A. The thin cured coating had a 98° water contact angle, and pencil hardness was 3H. Exudation of oil was not observed.

After the obtained coated PET film was retained for 1 month at room temperature, a cellophane tape was adhered to its surface for subjecting the coating to a peeling test (peeling rate: 100 mm/min; angle 180°). The coating could not be peeled off and remained strongly adhered to the PET film.

Furthermore, when the surface of the thin film layer was rubbed with steel wool, there were practically no scratches.

The light transmittance (550 nm) of the resultant PET film was measured using a UV-visible spectrophotometer (UV-visible Recording Spectrophotometer from Shimadzu Corp., UV-265FW). The light transmittance was even higher than in an untreated PET film. In other words, if the light transmittance of the untreated film was assumed as 100%, in the coated film this characteristic was improved to 104%. The friction test on a Taber abrasion tester (with a friction load of 500 g and 100 rotations of the abrasive wheel) did not change the transmittance characteristics of the coated film that, after repeated measurements, remained at the same level of 104%.

PRACTICAL EXAMPLE 2

A flask was filled with 52.3 g of toluene, 21 g of IPA, and 23.9 g of a mixture of dipentaerythritol hexaacrylate (60 wt. %) and dipentaerythritol (monohydroxy) pentaacrylate (40 wt. %) (content of acrylate-functional groups: 0.24 mole), and the components were stirred. Following this, 1.5 g of an amino-modified dimethylpolysiloxane fluid (content of amino groups: 0.002 mole) of the average molecular formula given below were added, and the mixture was heated and stirred for 1 hour at 50° C.

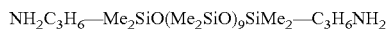

As a result, a reaction mixture was produced.

The product was combined sequentially with 3.7 g of 3-methacryloxypropyl trimethoxysilane, 45 g of an IPA dispersion of a colloidal silica (concentration: 30 wt. %; average size of a colloidal silica particle: 13 nm), 0.46 g of water, and the components were stirred for 1 hours. After the mixture was cooled, 2.25 g of a photopolymerization initiator (the product of Chiba-Geigy Japan, registered trademark: IRGACURE 184®), and 4.5 mg of phenothiazine were added. The resulting product comprised an acryloxy-functional silicone composition B.

With the use of a bar coater, the obtained composition B was applied onto a 188 μm-thick PET film, and the coating was dried for 2 minutes at 120° C. The coating was then cured by exposing to ultraviolet radiation having intensity of 350 mJ/cm². This produced a PET film coated with a 2 μm-thick coating layer of cured composition B.

The thin cured coating had a 100° water contact angle, and pencil hardness was 3H.

After the obtained coated PET film was retained for 1 month at room temperature, the coating was subjected to a peeling test by the same method as described in Practical Example 1. The coating could not be peeled off and remained strongly adhered to the PET film.

Furthermore, when the surface of the thin film layer was rubbed with steel wool, there were practically no scratches. The light transmittance (550 nm) of the resultant PET film was measured by the same method as in Practical Example 1. The light transmittance was 105% and was improved as compared to the untreated PET film.

A static coefficient of friction on the surface of the cured coating film was measured with the use of a portable friction tester (the product of Shinto Kagaku Co., Ltd. (Tribogear-Muse Type 941) and was equal to 0.17 μs, which is an improvement over the static coefficient of friction on the surface of the untreated film (0.19 μs).

PRACTICAL EXAMPLE 3

A flask was filled with 21 g of toluene, 52 g of IPA, and 24 g of a mixture of dipentaerythritol hexaacrylate (60 wt. %) and dipentaerythritol (monohydroxy) pentaacrylate (40 wt. %) (content of acrylate-functional groups: 0.24 mole), and the components were stirred. Following this, 3 g of an amino-modified dimethylpolysiloxane fluid (content of amino groups: 0.001 mole) of the average molecular formula given below were added, and the mixture was heated and stirred for 1 hour at 50° C.

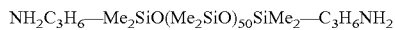

As a result, a reaction mixture was produced.

The product was combined sequentially with 3.7 g of 3-methacryloxypropyl trimethoxysilane, 45 g of an IPA dispersion of a colloidal silica (concentration: 30 wt. %; average size of a colloidal silica particle: 13 nm), 0.46 g of water, and the components were stirred for 1 hour. After the mixture was cooled, 2.25 g of a photopolymerization initiator (the product of Chiba-Geigy Japan, registered trademark: IRGACURE 184®), and 4.5 mg of phenothiazine were added. The resulting product comprised an acryloxy-functional silicone composition C.

With the use of a bar coater, the obtained composition C was applied onto a 188 μm-thick PET film, and the coating was dried for 2 minutes at 120° C. The coating was then cured by exposing to ultraviolet radiation having intensity of 350 mJ/cm². This produced a PET film coated with a 2 μm-thick coating layer of cured composition C.

The thin cured coating had a 99° water contact angle, and pencil hardness was 3H.

After the obtained coated PET film was retained for 1 month at room temperature, the coating was subjected to a peeling test by the same method as described in Practical Example 1. The coating could not be peeled off and remained strongly adhered to the PET film. Furthermore, when the surface of the thin film layer was rubbed with steel wool, there were practically no scratches.

The light transmittance (550 nm) of the resultant PET film was measured by the same method as in Practical Example 1. The light transmittance was 103% and was improved as compared to the untreated PET film.

A static coefficient of friction on the surface of the cured coating film was measured by the same method as described in Practical Example 2 and was equal to 0.11 μs, which is an improvement over the static coefficient of friction on the surface of the untreated film (0.19 μs).

PRACTICAL EXAMPLE 4

A flask was filled with 52.3 g of toluene, 21 g of IPA, and 23.9 g of a mixture of dipentaerythritol hexaacrylate (60 wt. %) and dipentaerythritol (monohydroxy) pentaacrylate (40 wt. %) (content of acrylate-functional groups: 0.24 mole), and the components were stirred. Following this, 1.49 g of an amino-modified dimethylpolysiloxane fluid (content of amino groups: 0.001 mole) of the average molecular formula given below were added, and the mixture was heated and stirred for 1 hour at 50° C.

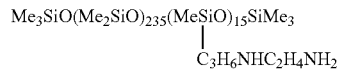

As a result, a reaction mixture was produced.

The product was combined sequentially with 3.74 g of 3-methacryloxypropyl trimethoxysilane, 44.9 g of an IPA dispersion of a colloidal silica (concentration: 30 wt. %; average size of a colloidal silica particle: 13 nm), and the components were stirred for 1 hours. After the mixture was cooled, 2.25 g of a photopolymerization initiator (the product of Chiba-Geigy Japan, registered trademark: IRGACURE 184®), and 4.5 mg of phenothiazine were added. The resulting product comprised an acryloxy-functional silicone composition D.

With the use of a bar coater, the obtained composition D was applied onto a 188 μm-thick PET film, and the coating was dried for 2 minutes at 120° C. The coating was then cured by exposing to ultraviolet radiation having intensity of 350 mJ/cm². This produced a PET film coated with a 2 μm-thick coating layer of cured composition D.

The thin cured coating had a 97° water contact angle, and pencil hardness was 3H. Exudation of oil was not observed. Furthermore, when the surface of the thin film layer was rubbed with steel wool, there were practically no scratches.

COMPARATIVE EXAMPLE 1

An acryloxy-functional silicone composition was prepared by the same method as in Practical Example 1, with the exception that 3.74 g of 3-methacryloxypropyl trimethoxysilane were not added. The obtained composition had white turbidity, and a white precipitate appeared after 1-month storage. Thus, it could be concluded that storage stability of the composition was insufficient.

COMPARATIVE EXAMPLE 2

A flask was filled with 52.3 g of toluene, 21 g of IPA, and 23.9 g of a mixture of dipentaerytliritol hexaacrylate (60 wt. %) and dipentaerythritol (monohydroxy) pentaacrylate (40 wt. %), and the components were stirred. The product was then combined sequentially with 3.74 g of 3-methacryloxypropyl trimethoxysilane, 44.9 g of an IPA dispersion of a colloidal silica (concentration: 30 wt. %; average size of a colloidal silica particle: 13 nm), 0.46 g of water, and the components were stirred for 1 hour. After the mixture was cooled, 2.25 g of a photopolymerization initiator (the product of Chiba-Geigy Japan, registered trademark: IRGACURE 184®), and 4.5 mg of phenothiazine were added. The resulting product comprised an acryloxy-functional silicone composition.

The obtained composition was applied onto a PET film by the method described in Practical Example 1. The thin cured coating had a 80° water contact angle. It could be assumed that the coating had insufficient water-repellency.

COMPARATIVE EXAMPLE 3

An acryloxy-functional silicone composition was prepared by the same method as in Practical Example 1, with the exception that 0.2 g of a polydimethylsiloxane fluid having viscosity of 270 mm$^2$/s and polyoxyethylene groups in side molecular chains (the content of polyoxyethylene chains: 47 wt. %) were used instead of the amino-modified dimethylpolysiloxane fluid.

The obtained composition was applied onto a PET film by the method described in Practical Example 1. The thin cured coating had a 90° water contact angle. It could be assumed that the coating had insufficient water-repellency. Observation showed exudation of oil on the surface of the cured layer.

The above-described composition of the present invention is characterized by excellent storage stability, while a product obtained by curing the composition is characterized by high resistance to scratching, transparency, water repellency, adhesiveness, weather-proof properties, and resistance to ultraviolet rays. Therefore, the composition is suitable for use as a film-forming agent and a coating agent for coating various substrates. A preliminary reaction between components (A) and (B) prevents exudation of oil from the coating film and prevents loss of stability with the lapse of time. The composition of the present invention may find use in various applications that employ thin cured films, such as protective films on vehicle windows, construction glass, displays, touch panels, or magnetic cards; transparent resin glass of vehicle head lamps, etc.

The invention claimed is:

1. An acryloxy-functional silicone composition curable by high-energy radiation comprising:
    (A) 100 parts by weight of a polyfunctional acrylate;
    (B) 1 to 30 parts by weight of an amino-modified organopolysiloxane fluid, wherein the mole quantity of amino groups in component (B) is smaller than the mole quantity of acrylate-functional groups in component (A);
    (C) 1 to 30 parts by weight of an organoalkoxysilane having an aliphatic unsaturated bond;
    (D) 1 to 100 parts by weight of a colloidal silica; and
    (E) 10 to 1000 parts by weight of an alcohol-containing organic solvent.

2. The acryloxy-functional silicone composition curable by high-energy radiation according to claim 1, further comprising (G) water for hydrolysis of component (C).

3. The acryloxy-functional silicone composition curable by high-energy radiation according to claim 2 wherein component (G) is present in an amount of 1 to 50 parts based on 100 parts by weight of component (C).

4. The acryloxy-functional silicone composition curable by high-energy radiation according to claim 1, wherein component (B) is present in an amount of less than 1/5th the weight of component (A).

5. The acryloxy-functional silicone composition curable by high-energy radiation according to claim 1, wherein component (A) is an acrylate of penta- or higher functionality.

6. The acryloxy-functional silicone composition curable by high-energy radiation according to claim 1, further comprising a photopolymerization initiator (H).

7. The acryloxy-functional silicone composition curable by high-energy radiation according to claim 1, wherein component (B) has a degree of polymerization within the range of 1 to 1000.

8. The acryloxy-functional silicone composition curable by high-energy radiation according to claim 1, wherein component (B) has a degree of polymerization within the range of 2 to 500.

9. The acryloxy-functional silicone composition curable by high-energy radiation according to claim 1, wherein component (B) has a linear or partially branched linear structure.

10. An acryloxy-functional silicone composition curable by high-energy radiation comprising:
    (A) 100 parts by weight of a polyfunctional acrylate;
    (F) 1 to 100 parts by weight of a product of a Michael addition reaction between component (A) and (B) an amino-modified organopolysiloxane fluid;
    (C) 1 to 30 parts by weight of an organoalkoxysilane having an aliphatic unsaturated bond;
    (D) 1 to 100 parts by weight of a colloidal silica; and
    (E) 10 to 1000 parts by weight of an alcohol-containing organic solvent.

11. The acryloxy-functional silicone composition curable by high-energy radiation according to claim 10, further comprising (G) water for hydrolysis of component (C).

12. The acryloxy-functional silicone composition curable by high-energy radiation according to claim 11, wherein component (G) is present in an amount of 1 to 50 parts based on 100 parts by weight of component (C).

13. The acryloxy-functional silicone composition curable by high-energy radiation according to claim 10, wherein component (B) is present in an amount of less than 1/5th the weight of component (A).

14. The acryloxy-functional silicone composition curable by high-energy radiation according to claim 10, wherein component (A) is an acrylate of penta- or higher functionality.

15. The acryloxy-functional silicone composition curable by high-energy radiation according to claim 10, further comprising a photopolymerization initiator (H).

16. The acryloxy-functional silicone composition curable by high-energy radiation according to claim 10, wherein component (B) has a degree of polymerization within the range of 1 to 1000.

17. The acryloxy-functional silicone composition curable by high-energy radiation according to claim 10, wherein component (B) has a degree of polymerization within the range of 2 to 500.

18. The acryloxy-functional silicone composition curable by high-energy radiation according to claim 10, wherein component (B) has a linear or partially branched linear structure.

* * * * *